United States Patent [19]

Miller

[11] 3,962,937

[45] June 15, 1976

[54] ERROR ADJUSTMENT METHOD AND STRUCTURE FOR LATHES AND THE LIKE

[76] Inventor: Leo C. Miller, 11110 Dodson Lane, Wheaton, Md. 20902

[22] Filed: July 18, 1974

[21] Appl. No.: 489,744

[52] U.S. Cl. .................................. 82/1 C; 82/40 R; 82/45; 279/6; 33/181 R

[51] Int. Cl.$^{2}$ ....................... B23B 25/06; B23B 1/00

[58] Field of Search .................... 82/45, 40, 30, 1 C; 279/1 L, 1 J, 1 M, 1 ME, 6; 33/181 R

[56] References Cited

UNITED STATES PATENTS

| | | | |
|---|---|---|---|
| 2,399,290 | 4/1946 | Nightingale | 82/45 |
| 2,741,481 | 4/1956 | Ortegren | 279/1 M |
| 2,819,905 | 1/1958 | Stead | 279/1 M |
| 3,484,115 | 12/1969 | Meyer | 279/6 |
| 3,529,841 | 9/1970 | Hall | 279/6 |

FOREIGN PATENTS OR APPLICATIONS

| | | | |
|---|---|---|---|
| 1,117,328 | 5/1956 | France | 82/45 |

*Primary Examiner*—Leonidas Vlachos

[57] ABSTRACT

The invention relates to an adjustable attachment for metal-working lathes and the like, and the error adjusting method made possible thereby for eliminating runout and axial errors in a manner that makes one adjustment independent of the other. The proposed attachment device basically comprises: a first portion which attaches to the headstock spindle of the lathe; a second portion which holds the chuck; and a third portion disposed intermediate the first and second portions, with all three portions being braced together but free to be moved relative to one another in a sideways or radial direction during error adjustment. The relative motion between the first and third portions corrects for axial error and is about a circular path whose center of curvature is on the axis of rotation of the spindle and far enough out to clear the jaws of the chuck; whereas, the relative motion between the second and third portions corrects for runout error and is perpendicular to the axis of the second portion and substantially perpendicular to the spindle axis. Means for clamping the three portions together, once the runout and axial errors have been corrected, is also provided.

21 Claims, 6 Drawing Figures

ERROR ADJUSTMENT METHOD AND STRUCTURE FOR LATHES AND THE LIKE

BACKGROUND OF THE INVENTION

1. Field of the Invention

This invention pertains to the field of metal-working lathes or other machine tools wherein the workpiece is gripped in a chuck or clamp of any sort, and then rotated in contact with a stationary or moving clutter blade. Specifically, the proposed device permits quick, accurate adjustments to eliminate eccentricity (normally called runout) and axial misalignment of the workpiece, both of which errors are caused by inaccuracies in construction of the chuck, worn or damaged jaws, slides, or scrolls in the chuck, or contamination of the contacting surfaces between the chuck jaws and the workpiece. Most importantly, the new mechanism permits these adjustments to be made independently, so that a two-step process removes all errors, and no back-and-forth, or trial-and-error process is required.

2. Description of the Prior Art

The prior art is known to include many devices capable of correcting both runout and axial errors of the workpiece due to any or all of the above causes. However, so far as is known, none of the previous devices (1) measure the errors of the rotating workpiece itself, (2) have a single adjustment for each type of error, or (3) enable one error to be corrected without affecting the other. Even the well-known and commonly-used 3-jaw and 4-jaw chucks do not provide any means of correcting for axial errors.

SUMMARY OF THE INVENTION

The proposed attachment device of the present invention makes possible the quick, accurate, elminina-tion of runout and axial errors inherent in used, damaged, or contaminated chucks. By sensing the surface of the workpiece, use of the invention makes the source of these errors unimportant, since the workpiece is the element which must run true for accuracy in machining operations.

In the illustrated embodiment, the proposed device is comprised of three plate members, which are biased together magnetically to hold the attachment, the chuck, and the workpiece firmly during adjustment operations, only allowing the relative movement between the plates substantially radially from the spindle axis. After the error adjustment has been completed, the plates are clamped together firmly.

The plate member which attaches to, and is driven by, the headstock spindle has an accurately machined concave spherical surface on the side away from the spindle (outer side), with the center of curvature out (away from the spindle) on the axis of rotation of the spindle at a distance clear of the jaws of the chuck being used. The center plate has a matching convex spherical surface which contacts the outer spherical surface of the first plate so that an adjustment which moves the center plate will cause axial rotation about this center of curvature. The third plate (out from the spindle) has a flat inner surface, which mates against an abutting flat outer surface of the center plate. The outer surface of the third plate is configured to support the lathe chuck in two optional ways. A freely-rotating ring on the center plate contains two adjusting screws (one for runout error and the other for axial error), so mounted that each will push one of the adjoining plates radially with respect to the center plate, along any radius line selected by rotating the ring. In this manner, the stress of one adjustment causes no tendency to move the other adjustable surface position.

In use, a standard dial indicator is placed by the operator on the top of the workpiece directly above the center of curvature of the spherical surfaces, and the operator then rotates by hand the attachment, chuck, and workpiece (noting the peak-to-peak readings on the indicator) and stops when the dial indicates maximum deflection upward. The ring is then rotated to bring the adjusting screws to the top position, and the runout adjustment screw is turned in to push the third or outermost plate to the mid-point of the peak-to-peak readings as shown by the indicator. The center or longitudinal axis of the workpiece at the measurement point is then at the center of curvature of the surfaces between the first (innermost) and center plates, which is on the axis of rotation of the lathe spindle since it was machined that way. The adjusting screw just used is then backed off so the ring will rotate freely, the indicator is moved out to a point near the end of the workpiece, and the identical process is repeated, this time using the other or axial error adjustment screw, to push the first plate with respect to the center plate. This removes the axial error, without altering the previous adjustment, since the axial correction rotates the workpiece (longitudinally, this time) around the previously-used reference point, namely, the center of curvature of the spherical surfaces. The axial adjusting screw just used is then backed off, and the main clamping means; e.g., nuts and bolts, are tightened, to prevent any relative motion during the stress of the machining operation. By detecting, and then correcting, the errors at their peak angle, it is possible to remove completely either type of error with only one adjustment screw. In effect, the system works in polar coordinates, instead of rectangular, or X-Y coordinates, thus reducing the number of adjustments required. The immunity of the runout adjustment from the axial adjustment is due to the coincidence between the first (runout) measurement point and the center of curvature of the surfaces controlling the axial adjustment. This reduces the adjustment process to two (non-interacting) adjustments. As will be discussed in more detail hereinafter, when describing the details of the illustrated embodiment, construction of proposed device is preferably such that a through-hole exists in the attachment, so that long workpieces can be passed through the chuck, the attachment, and the headstock spindle, as is common practice when working with the chuck attached directly to the headstock spindle.

From the foregoing discussion it will be seen that the principal objective of the invention is to provide an attachment structure for lathes and the like which will enable quick, accurate adjustments to eliminate runout and axial errors which cause irregular motion of the workpiece when rotating.

Another objective of this invention is to provide an attachment structure of the type described which employs an adjustment configuration which permits independent adjustment for runout and axial errors; i.e., which will not disturb the runout adjustment, once set, when the axial adjustment is made.

Another objective of this invention is to provide an adjustment device which will permit worn or damaged chucks, or those of inferior quality, to be used for precision work.

Another objective of this invention is to provide an adjustment mechanism which will reduce set-up time required for precision work.

Another objective of this invention is to provide an adjustment device which can be adjusted with great precision and speed by skilled or unskilled operators.

Another objective of this invention is to provide an adjustment configuration which operates in a radial direction so that only one measurement, and one adjustment, is required for each basic type of error.

Another objective of this invention is to provide an adjustment device which is adapted to be attached to lathes and the like and which is capable of correcting both types of errors from measurements made on the workpiece itself, so that errors due to contamination of the chuck or workpiece by metal chips, dirt, rust, etc., do not affect the accuracy of the final adjustment.

Another objective of this invention is to provide a device that works in conjunction with the standard dial indicator, available in any machine shop, as its measurement device.

Another objective of this invention is to provide a device which is itself completely sealed against incursion of metal chips, grinding particles, dirt, and other contaminants.

Another objective of this invention is to provide an adjustment device which retains the pass-through hole for long, slender work, in the same manner as is common practice with standard chucks and lathe spindles.

Another objective of this invention is to provide an adjusting device which will operate with workpieces of any reasonable shape, including stock of round, square, hexagonal, octagonal, triangular, and tapered cross sections.

Another objective of this invention is to provide an adjustment device which enables a center-drilled workpiece to be accurately centered with the tailstock center, to eliminate strain in the workpiece caused by the combined use of a tailstock center with a chuck having axial or runout errors.

Another objective of this invention is to provide an adjustment device which is economical to manufacture, and rugged in construction for long, trouble-free service.

Other objects, purposes, and characteristic features of the present invention will in part be pointed out as the description of the invention progresses and in part be obvious from the accompanying drawings wherein.

Figure 4:
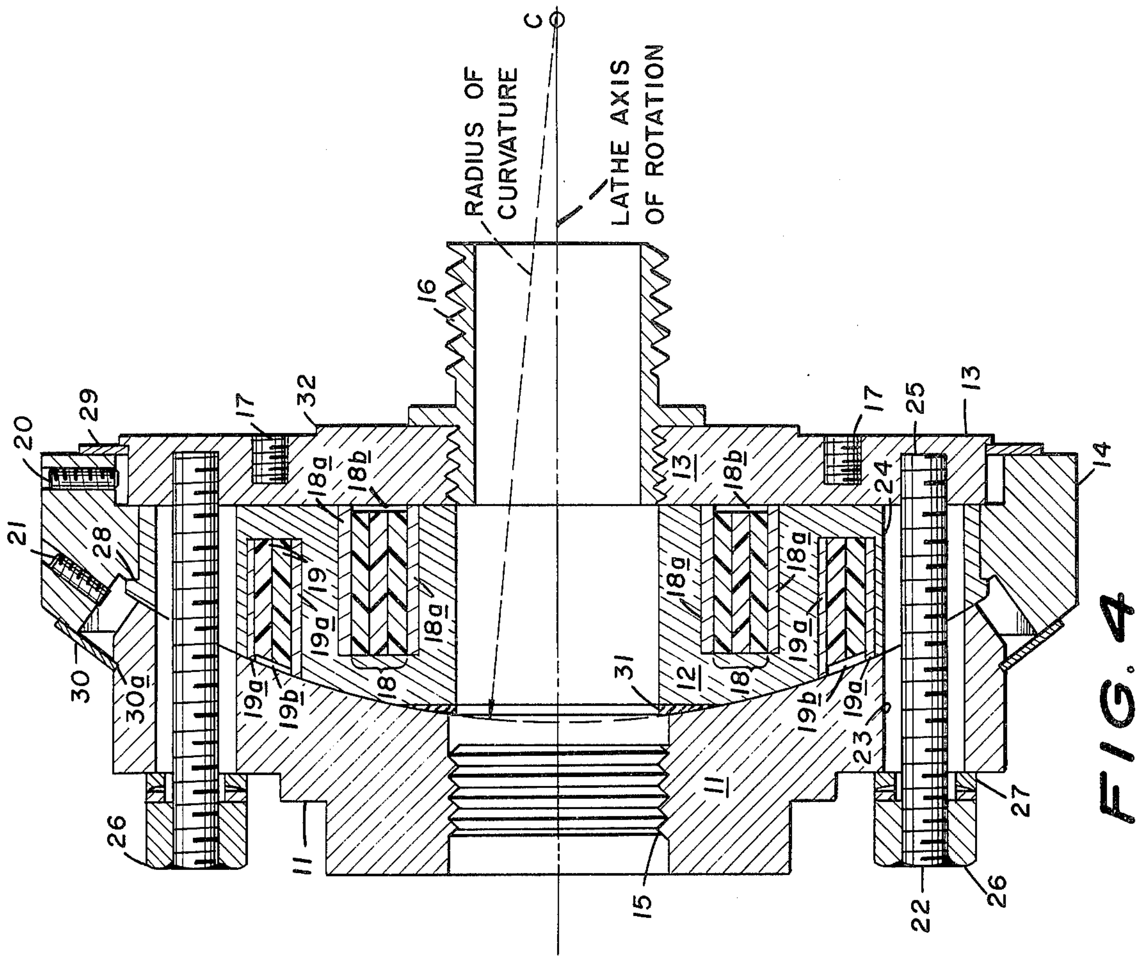
FIG. 4 is a sectional view taken along line 4—4 in FIG. 2 and viewed in the direction of the arrows.
Figure 1:
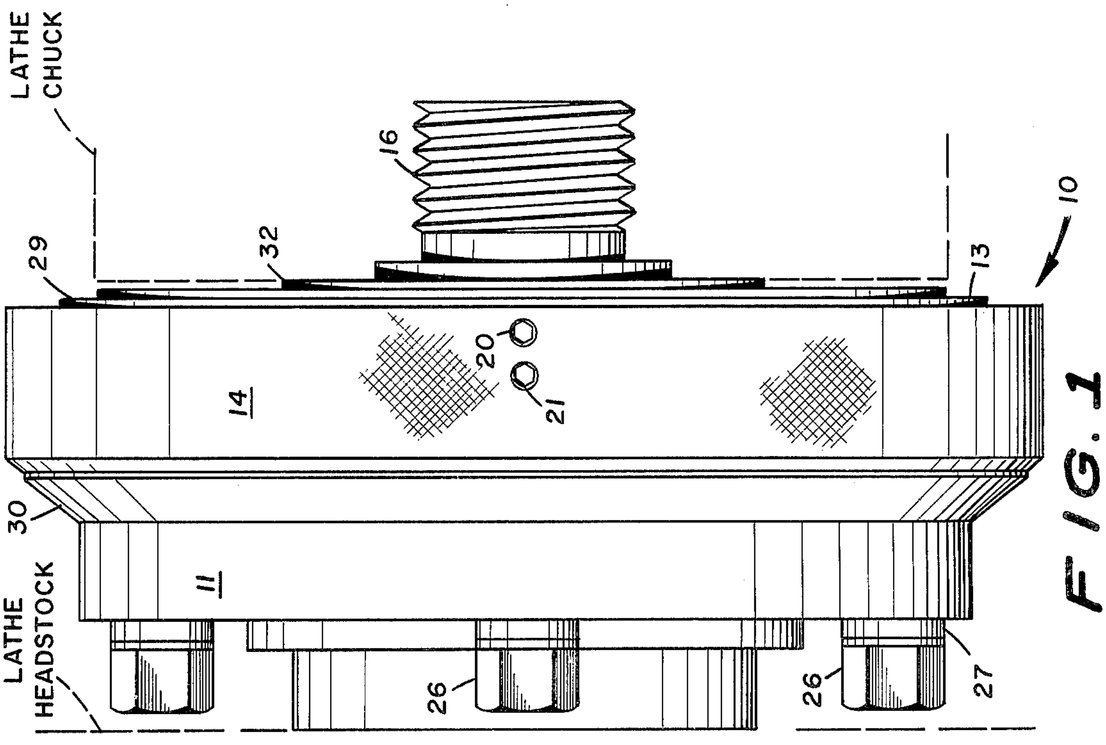
FIG. 1 is a top view of one embodiment of the proposed error correcting structure showing in phantom a typical mounting thereof relative to the headstock spindle and chuck of a lathe.
Figure 2:
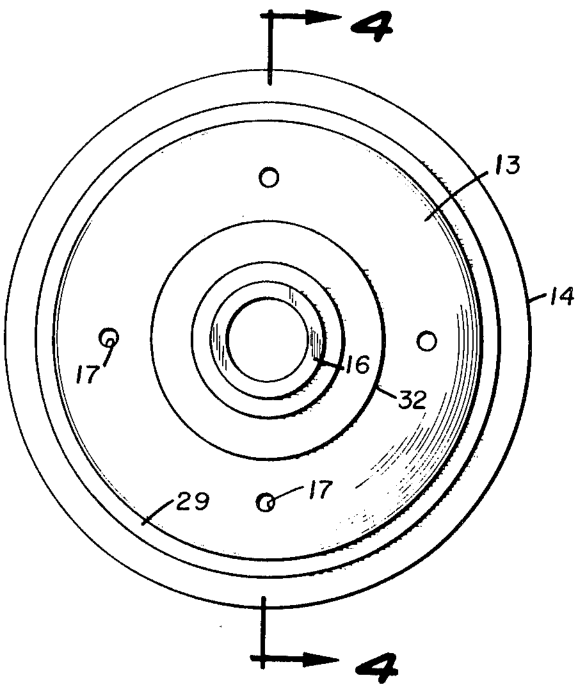
FIG. 2 is a front view of the illustrated embodiment, looking toward the lathe headstock.
Figure 3:
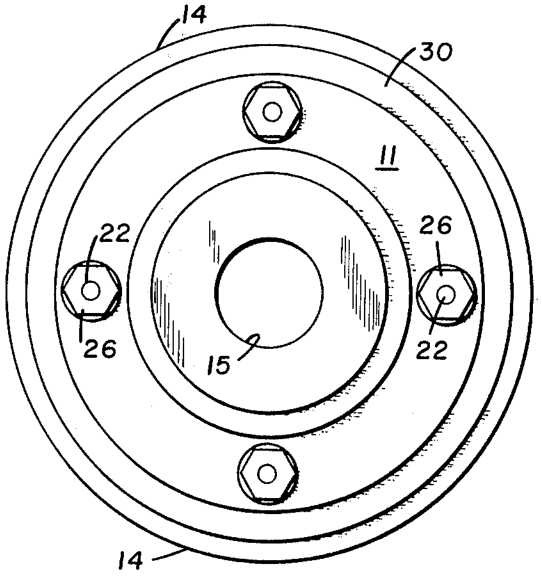
FIG. 3 is a back view.
Figure 6:
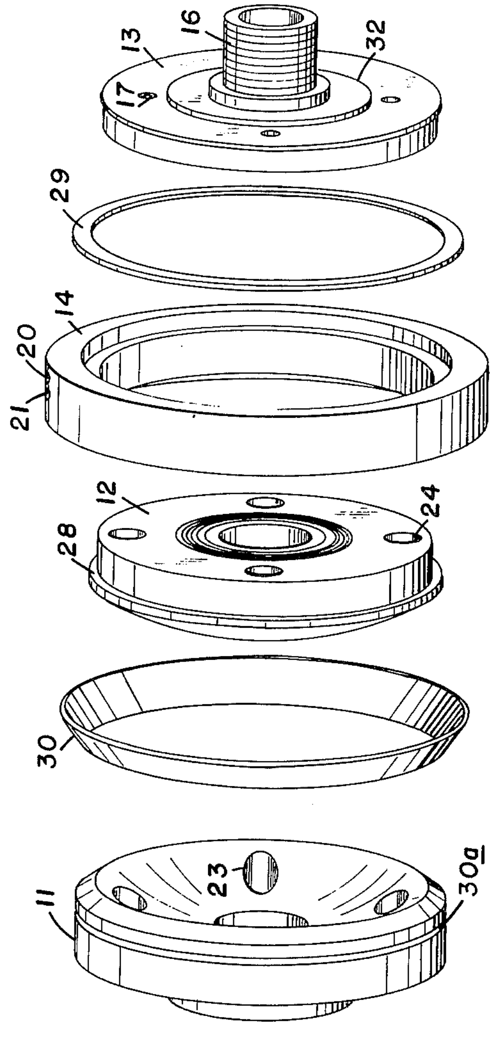
FIG. 6 is a perspective view of the illustrated embodiment showing the major parts of the proposed structure disassembled.

Referring now to FIG. 1 of the drawings, the illustrated embodiment of the proposed device is generally designated at 10 and is adapted to be mounted on the headstock portion of a conventional metal-working lathe and to have attached thereto the usual lathe chuck. More particularly, and shown most clearly in FIGS. 4 and 6, the proposed structure includes three plate-like or disc members 11, 12 and 13 and an adjusting ring 14 which encircles and mates with the peripheral edge of center plate 12. The back or left-hand side of the plate 11 is adapted to attach to the lathe spindle in the usual manner of a conventional chuck; i.e., in the illustration, an internal thread 15 is provided for screw-on attachment to the usual male fitting of the spindle (not shown) so that the plate 11 is centered relative to the spindle axis. The outermost or right-hand plate 13 is designed to have a conventional chuck attached to it, and this can be accomplished for example by means of the adapter 16 which is threaded into the center of the plate 13 and has a threaded extending end to receive the chuck (not shown). Alternatively, threaded blind holes 17 can be used to mount the chuck to the plate 13 when through-bolts from the front of the chuck are preferred. The outer or right-hand surface of the plate 11 and the lefthand surface of the center plate 12 are mating concave and convex spherical surfaces respectively, accurately machined with the same radius of curvature such that the center of curvature, point C, coincides with the axis of rotation for the spindle beyond (to the right of in the drawings) the chuck. The opposite surface of the center plate 12 is flat, as is the contacting left-hand surface of the outermost plate 13.

The three plates 11, 12 and 13 are held or biased together magnetically by means of ring magnets 18 and 19 which are secured within annular slots in the opposite sides of the center plate 12; each permanent magnet 18, 19 having a pair of thin annular pole pieces 18a, 19a disposed within the center plate slots on either side of the associated permanent magnet (see FIG. 4) with an edge of the pole pieces in contact with the adjacent surfaces of the plates 11 and 13. A small (e.g., 1/16 inch) annular air gap 18b, 19b exists between the edge of the permanent magnet 18, 19 and the adjacent plate 13, 11. In one practical application of the proposed structure, the ring magnets 18 and 19 are formed of multiple layers (⅛× 1inch) of Plastiform Type 1 permanent magnet material manufactured by the 3M Company, with 0.0625 and 0.090 inch sheet steel pole pieces, respectively; the plates 11 and 13 are made of cold rolled steel; adjusting ring 14 which holds the runout and axial adjustment screws 20 and 21 is aluminum, with threaded steel inserts to hold the adjustment screws; and, plate 12 is stainless steel since it must be non-magnetic to isolate fringing flux and force the flux from the magnets into the contacting plates 11 and 13 for maximum holding force.

Suitable clamping bolts 22 extend through the plates 11 and 12 and are screwed firmly into the blind holes 25 in the back or left-hand surface of the plate 13. These bolts 22 are provided, at their left-hand ends with clamp nuts 26 and spherical washers 27 which allow for slight angular misalignments between the clamp nuts 26 and the back of plate 11 and assure firm, flat contact between the threaded nuts 26 and the back of plate 11 after the angular offset has occurred due to adjustment between plates 11 and 12 along the spherical surfaces where they contact.

The adjusting ring 14 is sized to rotate freely on the periphery of plate 12 but is constrained in the axial direction by the lip 28 on plate 12, to prevent leftward movement, and by the outer edge of plate 13 to prevent rightward movement. A plastic dust cover ring 29 allows for the radial movement during adjustments, but seals the joint between plate 13 and ring 14 against contamination by particles of metal, dirt, and abrasives. Another plastic dust cover ring 30 seals the joint between plate 11 and the adjusting ring 14, but allows the motion required between plates 11 and 12 during adjustments. The dust cover 30 and the mating surface of ring 14 are angled to allow close contact between them as the adjustment causes movement parallel to and along the curved surface between plates 11 and 12. The bottom edge of the dust cover 30 fits in V-shaped groove 30a around the outer surface of plate 11. An internal felt dust covering 31 is firmly attached to a flattened wall portion adjacent to and encircling the central hole in plate 12 and is shaped (see FIG. 4) to fit against the concave surface of plate 11, allowing motion between plates 11 and 12 during adjustments, but preventing the incursion of foreign particles from the workpiece to the inside of the mechanism. The runout adjustment screw 20 is shown threaded through the adjustment ring 14 in such a position that it can cause inward radial movement of plate 13 with respect to plate 12 which supports the adjustment ring 14, assuming that the clamping nuts 26 are loosened. Similarly, axial adjustment screw 21 is shown threaded into the edge of ring 14 in such a position that it can cause inward radial movement of plate 11 with respect to plate 12, acting along a tangent to the spherical interface. The clearance holes or bores 23–24 in the plates 11 and 12 are sized to allow for the relative displacement between the plates 11, 12 and 13 during runout and axial error adjustments.

In use, the proposed error adjusting device is screwed onto the lathe spindle and the chuck to be used is screwed onto the threaded adaptor 16 extending from the outer or right-hand face of plate 13 (or bolted into the optional holes 17) centered on an annular shoulder 32 of plate 13. The workpiece is then clamped in the chuck, and a standard dial indicator (shown dotted in FIG. 5) is placed to indicate the deflection of the workpiece surface as it revolves in the lathe; this first measurement being taken directly above the center of curvature, point C in FIG. 4, for the spherical interface between plates 11 and 12. This point C would be accurately predetermined and its location supplied with the attachment unit or it can be easily determined experimentally. In the practical application mentioned above, the radius of curvature for the concave surface of plate 11 and the convex surface of plate 12 is 5.50 inches.

The lathe drive is then disconnected so that the entire assembly can be rotated manually and the four clamping nuts 26 are backed off. The assembly is then rotated, observing the total deflection on the dial indicator. The indicator dial is then rotated until the deflection is equal on both sides of the zero indication, and the assembly is stopped at the maximum upward or clockwise dial indication. With the assembly in this position, the ring 14 is rotated to bring the adjusting screws 20 and 21 to the top of the device (as shown in FIGS. 1–4) and the runout adjusting screw 20, which may be a fine-pitch Allen-head screw, is turned in until the dial indicator reads zero (assuming of course that the clamping nuts 26 are loose); i.e., the runout adjustment screw 20 forces the outer plate 13 downwardly relative to center plate 12 as represented by the arrow A in FIG. 5 to bring the center or longitudinal axis of the workpiece (its desired axis of rotation) into coincidence with the axis of rotation of the machine. In practice, the runout correction is thus zeroed within the operator's judgment of the angle of correction as determined by his positioning of the adjusting screws 20 and 21 when rotating the ring 14. If extreme accuracy is desired, the process above can be repeated to remove the residual error from the first or runout adjustment. If a second, or fine adjustment is made, the operator will find any consistent tendency he has to turn the screw 20 too far because the screw 20 for the second adjustment will be consistently on the bottom of the unit when he stops the assembly at maximum upward deflection, and vice versa.

Figure 5:
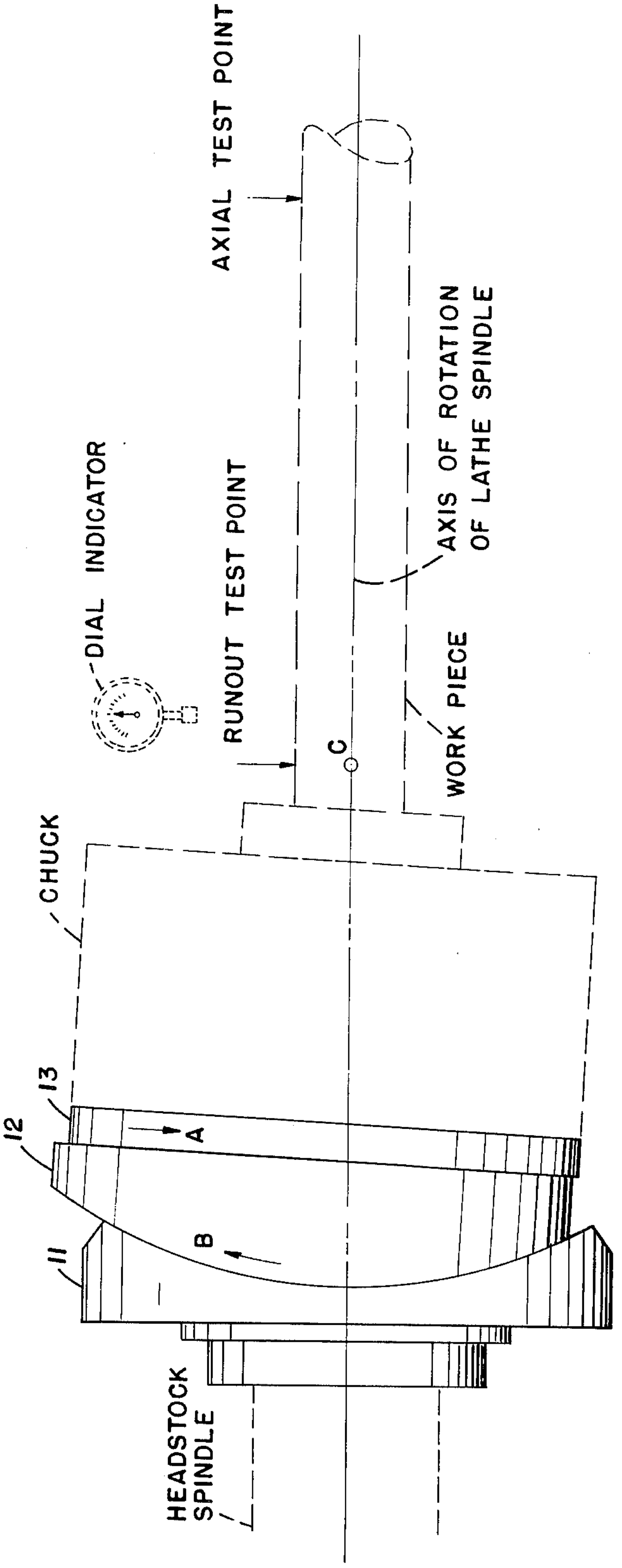
FIG. 5 is a simplified and exaggerated diagrammatic illustration of the relative positions of the parts after a typical adjustment to compensate for runout and axial errors.

The operator then moves the dial indicator out away from the chuck to an axial test point near the far end of the workpiece (see FIG. 5). This may be conveniently done with the lathe's carriage handwheel if the indicator is mounted on the lathe's carriage. Making sure that the adjusting screws 20 and 21 are backed off from their contacts with plates 11 and 13, he then repeats the previous process identically; that is, he rotates the assembly to observe total deflection, (in this second adjustment, rotation of the indicator dial to obtain equal amounts of deflection on each side of the zero reading is unnecessary) and then turns in adjusting screw 21 until the maximum deflection is zeroed. The facility to make these adjustments in an identical manner is achieved by the unique geometry of the device and the relationship of the adjusting screws 20 and 21 to the plates they move during the adjustment. It should be noted that turning axial adjusting screw 21 lifts plate 12 with respect to plate 11, as represented by arrow B in FIG. 5, thus causing the workpiece to rotate axially around the previous measurement point (center of curvature point C), and lowers the workpiece end where the sensor is now located, thus reducing the upward deflection to zero, as shown on the indicator dial during the adjustment. This effect is exactly the same as the runout adjustment, which forced plate 13 (and the chuck and workpiece) down relative to plate 12 to remove the runout error, as previously described. Once the two error adjustments have been completed, the clamping nuts 26 are tightened and the lathe is ready for precision operation. It should be noted here that although (see FIG. 5) both runout and axial errors have been shown and described as being corrected in the plane of the drawing, they can in reality be corrected from any arbitrary angle, as shown necessary by the indicator dial which senses these errors on the workpiece itself.

As mentioned previously, one important feature of the present invention is that the runout and axial error adjustments just described are completely independent from one another. In other words, once the adjustment for runout error has been made, it will not be disturbed by the subsequent adjustment for axial error. This is so because (a) the runout error test point is aligned with the center of curvature point C and (b) the axial error is adjusted by displacing the plates 11 and 12 relative to one another along spherical surfaces each having this same point C as its center of curvature.

Various modifications, adaptations and alterations to the illustrated embodiment are of course possible. For example, additional, segmented magnets can be added to the second plate 12, i.e., at the radius of the through holes 24, facing either the first 11 or third 13 plate, to augment the strength of the front and/or rear magnets 18 and 19 as desired. Also, the magnetic strips can be trimmed, as necessary, to balance the attractive force about the center point of the second plate 12, to assure that the corrections produce a truly radial movement, minimizing residual errors after the first (runout) adjustment. Moreover, instead of using the ring permanent magnets 18 and 19 to continually bias the three plates 11, 12 and 13 together magnetically, an alternative manner for performing this biasing function would be to utilize a stretched coil spring means extending through a suitable hole in center plate 12, with opposite ends thereof anchored to the plate 11 and 13 respectively so as to continually maintain the plate 12 compressed between the other two plates. It should therefore be understood that within the scope of the appended claims, the invention may be practiced otherwise than as specifically described hereinabove.

What I claim is:

1. Apparatus adapted to adjust for runout and axial errors encountered during rotation of a workpiece about the axis of a lathe or like machine, comprising:

first means centered relative to said axis of rotation, second means movable relative to said first means about a curved path having a center of curvature substantially coincident with said axis of rotation substantially at the point along said workpiece at which runout error is measured, third means movable relative to said second means along a path extending substantially radially from said axis of rotation, said third means being secured fixedly to said workpiece, fourth means for moving said third means relative to said second means and without moving said second means relative to the axis of rotation of said machine to bring a point located within the workpiece and substantially on the desired axis of rotation of the workpiece into coincidence with said axis of rotation of the machine substantially at said center of curvature, and fifth means for moving said second means relative to said first means to rotate the desired axis of rotation of said workpiece about said center of curvature.

2. The apparatus specified in claim 1 wherein said curved path is defined by a spherical surface.

3. Apparatus adapted to adjust for runout and axial errors encountered during rotation of a workpiece about the axis of a lathe or like machine, comprising:

first, second and third plate members juxtapositioned relative to one another and being substantially aligned with the axis of rotation of said machine, said first plate member being affixed to said machine centered relative to said axis of rotation and having a concave spherical surface on one of its sides whose center of curvature coincides with the axis of rotation of said machine at a point falling within said workpiece when the axis of rotation of said workpiece coincides with said machine axis of rotation, substantially at the point along said workpiece at which runout error is measured, said second plate member having on one side a convex spherical surface mating with and having the same center of curvature as the concave spherical surface on said first plate member and having a flattened surface on its opposite side substantially perpendicular to the central axis of said convex spherical surface, said second plate member being movable relative to said first plate member along said mating spherical surfaces, said third plate member having a flattened surface aligned with and adjacent the flattened surface on said second plate member and having the workpiece affixed thereto extending from its opposite side, said third plate member being movable relative to said second plate along said adjacent flattened surfaces substantially radially from said axis of rotation of said machine, fourth means for moving said third plate member relative to said second plate member to bring a point located within the workpiece and substantially on the desired axis of rotation of the workpiece into coincidence with said axis of rotation of the machine substantially at said center of curvature, and fifth means for moving said second plate member relative to said first plate member to rotate the desired axis of rotation of said workpiece about said center of curvature.

4. The apparatus specified in claim 3 further including means for biasing together the spherical surfaces of said first and second plate members and the flattened surfaces of said second and third plate members.

5. The apparatus specified in claim 4 wherein said biasing means is permanent magnet means.

6. The apparatus specified in claim 5 wherein said permanent magnet means includes first and second annular permanent magnets mounted on the opposite sides of said second plate member for magnetically biasing said first and third plate members towards said second plate member.

7. The apparatus specified in claim 1 further including means for releasably clamping said first, second and third means together to prevent relative motion therebetween.

8. The apparatus specified in claim 3 further including means for releasably clamping said first, second and third plate members together to prevent relative motion therebetween.

9. The apparatus specified in claim 3 further including an annular member encircling said first, second and third plate members adjacent their edges, and adjusting screw means carried by said annular member for moving said first and third plate members relative to said second plate member along respectively a curved path defined by the mating spherical surfaces to said first and second plate members and a linear path defined by the aligned flattened surfaces of said second and third plate members extending radially from the axis of rotation of said third plate member and substantially radially from the axis of rotation of the machine.

10. The apparatus specified in claim 9 further including clamping bolt means, one end of said clamping bolt means extending through said first and second plate members and being anchored to said third plate, and the other end of said clamping bolt means being threaded to receive clamping nut means effective to clamp said first, second and third plate members together to prevent relative motion therebetween.

11. The apparatus specified in claim 10 further including spherical washer means carried on said clamping bolt means between a flattened surface of said first plate member and said clamping nut means for assuring effective clamping force by said clamp nut means.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

8 PT.

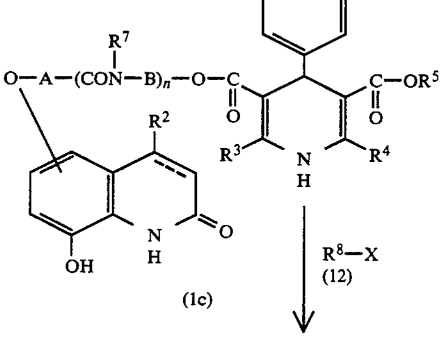

(1c)

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

6 PT.

$$v'_{ref}(t) = K\, r\, \delta \left( t - \frac{2L - 2d_s}{v_w} \right) + K\,(1 - r^2)e^{-2\alpha s d s}$$

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

4 PT.

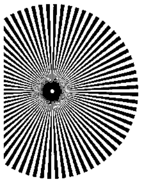

$$\cos \beta^* = \frac{K_2 - n\frac{T'}{v''}}{\sqrt{K_1^2 + \left(K_2 - n\frac{T'}{v''}\right)^2 + K_3^2}}$$

are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

8 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

6 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

4 PT.

$$(K_1x+K_2y+K_3z+T)+n(K''_1x+K''_2y+K''_3z+T'')=0$$

| r1 (L1) | r6 (L3) | r7 (L4) |
|---|---|---|
| K = 1.0 | K = 1.0 | K = 0.0 |
| C2 = 0.0 | C2 = 0.0 | C2 = 0.0 |
| C4 = −0.15691 × 10−6 | C4 = +0.95381 × 10−7 | C4 = −0.22891 × 10−5 |
| C6 = −0.40068 × 10−10 | C6 = −0.73871 × 10−10 | C6 = +0.12283 × 10−9 |
| C8 = +0.21016 × 10−13 | C8 = +0.12280 × 10−13 | C8 = +0.84230 × 10−13 |
| C10 = −0.37685 × 10−17 | C10 = −0.33177 × 10−17 | C10 = −0.20592 × 10−16 |

$f_1 = 314.6$
$f_2 = 88.0$
$f_3 = -481.2$
$f_4 = -99.6$

100mm

= 101.2 Aperture ratio: 1:1.10
agnification of projection: −7.997x
alf angle of view: 28.56°

| | | | |
|---|---|---|---|
| 43.454 | $d_1 = 11.0$ | $n_1 = 1.49380$ | $L_1$ |
| -1542.254 | $d_2 = 68$ | | |
| 16.976 | $d_3 = 20.0$ | $n_2 = 1.62286$ | $L_2$ |
| 10.914 | $d_4 = 2.87$ | | |
| -89.375 | $d_5 = 5.0$ | $n_3 = 1.59501$ | $L_3$ |
| -127.071 | $d_6 = 58.8$ | | |
| -48.609 | $d_7 = 5$ | $n_4 = 1.49380$ | $L_4$ |
| ɔ | | | |
| ɔ | $d_8 = 5$ | $n_5 = 1.45000$ | S |
| ∞ | $d_9 = 8$ | $n_6 = 1.51872$ | G |

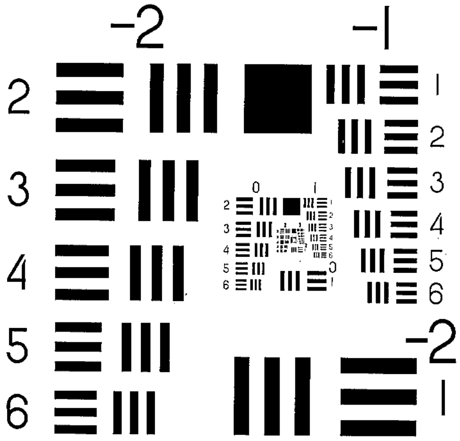

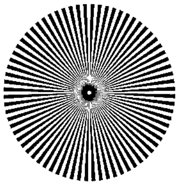

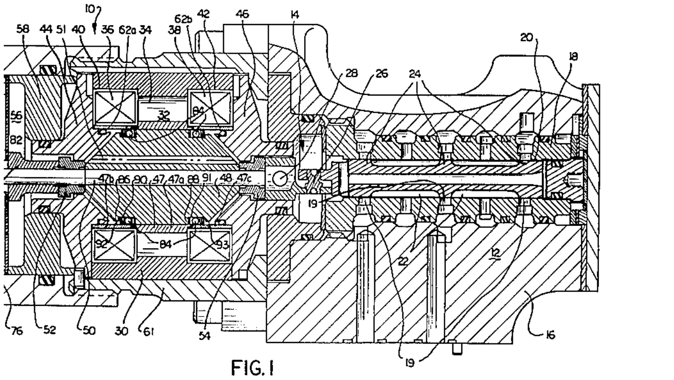
FIG. I

IMAGE SYSTEM
TEST TARGET
A
U.S. DEPARTMENT OF COMMERCE
PATENT AND TRADEMARK OFFICE